3,318,721
COATED POLYOLEFIN STRUCTURE, COMPOSITION AND METHOD FOR MAKING THE SAME
Glenn E. Lineburg, New London, Wis., assignor to Phillips Petroleum Company, a corporation of Delaware
No Drawing. Filed Jan. 17, 1964, Ser. No. 338,291
19 Claims. (Cl. 117—15)

This invention relates to the coating of polyolefin structures. In one aspect this invention relates to a composition of matter useful for coating film, sheets, and other structures comprising normally solid polymers of 1-olefins to render said structures ink receptive and/or adhesive receptive. In another aspect this invention relates to methods of coating said structures with said composition.

The use of normally solid polymers of 1-olefin hydrocarbons in various structural forms has greatly increased in recent years because of the many advantageous characteristics of said polymers. For example, in the packaging field the normally solid polymers of 1-olefin hydrocarbons are becoming ever more widely employed in the form of sheets, film, tubes, envelopes, bags, flexible bottles, and the like, because of their desirable visual properties, insolubility in many solvents, relatively low cost, flexibility, etc. It is also common practice to coat paper, paperboard, other paper products, and other substrates with thin films of said polymers to prepare packaging materials and other structures which thus acquire the desirable attributes of the polymer film. For many of these uses, such as those suggested in the packaging field, it is frequently desirable to add to the polyolefin structure a printing ink and/or an adhesive material. However, conventional printing inks do not adhere strongly to the polyolefin films or other structures and are not usually satisfactory for this purpose without some special treatment of the polyolefin structure. Attempts to solve this problem have been made by compounding special inks that will adhere strongly to the surface of polyolefin structures such as those named above. However, these special inks fail to meet with the approval of the printers, who prefer to use conventional inks. Said special inks also frequently require certain aftertreatments which cannot be carried out on the printing machinery normally employed.

Various treating processes have been proposed in the prior art for improving the ink receptivity and/or the adhesive receptivity of various structures formed of normally solid polymers of 1-olefin. Included among these are the various methods for subjecting the surface of the polyolefin material to an activation treatment. Said activation treatment has taken many forms. For example, it has been proposed that the polyolefin surface be subjected to a chemical oxidation treatment, flame treated, ozone treated, exposed to chlorine, treated with various acids, and/or subjected to various types of electrical bombardment, etc. Such methods do improve the ink and/or adhesive receptivity of the surface of polyolefin structures. Unfortunately, however, experience has shown that said improvement is nearly always of a temporary nature. Unless the printing ink, adhesive, or other coating is applied to the activated surface substantially immediately after activation thereof, it is likely that the coating will not properly adhere. The inks smear, rub-off, and/or are not waterproof. Other types of coatings peel, spall, or can be readily scraped from the surface.

In the packaging industry it is common practice for a polyolefin structure to be manufactured at one location and used in another. For example, a bottle manufacturer may manufacture the bottle, and then ship same to another manufacturer who fills it with his product. If the bottle manufacturer merely activates the surface of the bottle to render it ink and/or adhesive receptive, it is likely that by the time the user of the bottle receives same, said surface will no longer be ink and/or adhesive receptive. This problem is particularly acute with paper, paperboard, and other paper products. It is common practice in the paper and packaging industry for a coating of a polyolefin to be extruded onto the paper, paperboard, etc. at one location and then transported to a printer who applies the printing material to the thus produced web. Friction, such as occurs in contact with rollers and other machine parts, destroys the activation of the surface. Even in ordinary handling, shipping, and processing, it has been found that the activated surface is lost. Boxboard and paperboard, after coating with a suitable polyolefin such as polyethylene, is subjected to various cutting, stacking, and other handling operations wherein one sheet slides over another sheet. In such instances the loss of the activated surface is particularly noted. The sizing material employed in various paper products sometimes contributes to loss of the activated surface.

Various overcoating materials have been proposed for application to the activated surfaces of polyolefin structures. When using such an overcoating material the printing ink and/or adhesive is then applied to certain selected portions of the overcoated surface as desired. Such an overcoat should be durable, i.e., scuff-resistant. It should also be waterproof or at least water-resistant. In many instances it is desirable that the overcoating have a high gloss. The overcoating must possess good blocking properties and should be chemically stable, i.e., it should not oxidize and become yellow or brittle on aging or on exposure to heat and light. The overcoating composition itself should be mechanically stable, i.e., it should possess good resistance to shear during mixing operations before application and during the steps of applying same. Above all, the overcoating material must be ink and/or adhesive receptive. These numerous and varied requirements of both a chemical and physical nature make the problem of providing a satisfactory overcoat for polyolefin structures extremely difficult. For these reasons, practically all the overcoating compositions of the prior art are deficient in at least one or more of the above properties.

The present invention provides a solution for the above problems and overcomes said difficulties by providing a multi-component overcoating composition, the individual components of whcih co-operate with each other to obtain a unitary result, a coated polyolefin structure having excellent printing ink and/or adhesive receptivity.

Thus, broadly speaking, the present invention resides in said multi-component overcoating composition (defined further hereinafter), methods of applying said overcoating composition to polyolefin structures, and polyolefin structures coated with said overcoating composition.

An object of this invention is to provide an improved overcoating composition for polyolefin structures. Another object of this invention is to provide methods of applying to polyolefin structures the improved overcoating composition of the invention so as to render said structures ink and/or adhesive receptive. Another object of this invention is to provide various polyolefin structures which have been coated with the improved overcoating composition of the invention. Still another object of this invention is to provide a method of preparing said overcoating composition. Other aspects, objects, and advantages of the invention will be apparent to those skilled in the art in view of this disclosure.

A presently preferred overcoating composition in accordance with this invention is set forth in Table I below.

TABLE I

| Component: | Amount wt. percent wet basis |
|---|---|
| Rhoplex B15 [1] | 35 to 40 |
| Colloid 581B [2] | 0.50 to 1.20 |
| Surfynol 104E [3] | 0.20 to 0.75 |
| Rhoplex B85 [4] | 3 to 10 |
| Amberlac 165 [5] | 35 to 45 |
| Paracol 404C [6] | 1 to 3 |
| Aerosol OT [7] | 0.25 to 0.75 |
| Water | 10 to 20 |

[1] An aqueous dispersion of a copolymer of about 83 percent ethyl acrylate, 15 percent methyl methcarylate, and 2 percent methacrylic acid, and containing about 46 percent solids.
[2] Consists essentially of a suspension of about 10 weight percent aluminum stearate in a solvent consisting essentially of about 3 parts of liquid polyoxyethylene and 1 part of $C_{11}$ to $C_{13}$ paraffin hydrocarbon.
[3] Consists essentially of a 50 weight percent solution of 2,4,7,9-tetramethyl-5-decyne-4,7-diol in ethylene glycol.
[4] An aqueous dispersion of polymethyl methacrylate containing about 38 percent solids.
[5] An ammoniacal aqueous solution containing about 23 weight percent of the ammonium salt of an essentially 1:1 copolymer of maleic anhydride and diisobutylene.
[6] An aqueous suspension consisting essentially of a microcrystalline wax having a melting point of 80 to 82° C. and a density of about 0.91 g./cc. at 25° C., a small amount of a soluble polysaccharide such as starch or dextrine and containing about 48 weight percent solids.
[7] A surfactant consisting essentially of 75 percent dioctyl sodium sulfosuccinate, 5 percent ethyl alcohol, and 20 percent water.

In some instances, depending upon the final properties desired in the coating and/or the intended use of the coated polyolefin structure, the amounts of the various components set forth in Table I above can be varied to values outside the ranges there given. For example, in some instances the Rhoplex B85 can be used in amounts within the broader range of from 3 to 20 weight percent, the Amberlac 165 can be used in amounts within the broader range of from 30 to 50 weight percent, and the Aerosol OT can be used in amounts within the broader range of from 0.25 to 1.0 weight percent. Other variations with respect to said components are discussed hereinafter.

Further according to the invention, there is provided a method for imparting printing ink receptivity and adhesive receptivity to a polyolefin surface, which method comprises: activating said surface; and applying an overcoat composition onto said activated surface in an amount on a dry basis within the range of from 0.05 to 1.8 pounds per 1000 square feet of said surface; drying said overcoat composition to form an overcoat on said surface; said overcoat composition being substantially as set forth in the two preceding paragraphs.

Still further according to the invention, there is provided, as a new product, a polyolefin surface having thereon an adherent overcoat of the solids deposited upon drying a material consisting essentially of a composition substantially as set forth in Table I above and the paragraph immediately following said Table I.

Rhoplex B15 is a non-ionic emulsion of a relatively soft polymer. This emulsion gives good bonding strength and eliminates failure in printing with high tack inks. It possesses unusually good chemical stability and can withstand considerable shear and mechanical impact. It also is very receptive to most inks and yet offers a controlled ink hold-out.

Rhoplex B85 is an anionic emulsion of a hard polymer. When used with Phoplex B15 it increases the blocking temperature of the dried film. Increasing the ratio of B85 will gradually increase the blocking temperature to about 200° F. However, when the quantity of B85 in a B85/B15 mixture exceeds 60 percent the film loses its continuity. The B85 also decreases the bonding strength and ink receptivity of the B15 if used in large percentages.

The Amberlac 165 increases the resistance to blocking, increases the gloss and in combination with the two Rhoplexes gives good flexibility with resistance to scoring.

Generally, two types of foaming are encountered in the application of emulsion-type overcoating compositions, i.e. internal foaming and external or surface foaming. Internal foaming is foaming which occurs in the handling of the overcoating composition such as in the supply tank, the pumps, etc. Surface or external foaming is the foaming which occurs on the surface during and/or after application of the overcoating composition to the surface of the polyolefin structure. In the practice of the invention, it has been found that the use of both an internal anti-foam agent and an external or surface anti-foam agent gives much superior results as compared to the use of only one anti-foam agent. While the anti-foam agents set forth above in Table I are presently preferred for use in the practice of the invention, said invention is not necessarily limited thereto. Any suitable anti-foaming agents (internal and external) can be used. Examples of other anti-foaming agents which can be used in the practice of the invention include Nalco 212, Antifoam B, and Ahco Defoamer 69.

Paracol 404C is a refined microcrystalline wax aqueous emulsion. The incorporation of such a wax emulsion into the overcoating composition prevents picking or plucking of the overcoating, thereby enhancing the slip properties in automatic pasting machines, and greatly improves the scuff resistance. While Paracol 404C is the presently preferred wax emulsion for use in the practice of the invention, said invention is not necessarily limited thereto. Other suitable wax-containing materials which can be used in the practice of the invention include Alwax 253–C and Nopco 1055–M.

Aerosol OT is a surfactant possessing wetting and dispersing properties in the overcoating compositions of the invention. Said surfactant not only appears to render the emulsion more stable prior to application but also, quite unexpectedly, appears to promote emulsion particle coalescence after application of the polyolefin surface. The surfactants thus appear to aid in formation of the continuous overcoat which is formed by deposition of the solids upon drying of the liquid overcoating composition. The overcoating compositions of the invention containing such a surfactant have been found superior to overcoating compositions which do not. While Aerosol OT is the presently preferred surfactant for use in the practice of the invention, said invention is not necessarily limited thereto. Other surfactants which can be used in the practice of the invention include Igepal CO–610, Aerosol AY, and Aerosol MA.

The overcoating compositions of the invention can be prepared in any suitable manner such as by mixing the components thereof in a suitable mixing vessel equipped with means for gentle stirring. Thus, the invention is not limited to any particular mixing procedure or apparatus. However, experience has shown that much superior results are obtained when the components of the overcoating composition are mixed, with gentle agitation, in the order set forth in Table I above. The mixing can be and is usually carried out at room temperature. In a presently preferred embodiment of the invention, the Rhoplex B15 is introduced into the mixing vessel first. It has been found advantageous to predisperse the Colloid 581B in approximately an equal amount of water and then introduce the resulting dispersion into the mixing vessel with continuous gentle stirring. The other anti-foam agent, Surfynol 104E, is then introduced into said mixing vessel with gentle stirring. The Rhoplex B85 is then introduced into the mixing vessel with gentle stirring. It has been found important to slowly introduce the Amberlac 165 into the mixing vessel containing said other named ingredients, with gentle stirring. If said Amberlac 165 is introduced too rapidly, gellation sometimes occurs. The Paracol 404C is then introduced into the other components in the mixing vessel with gentle stirring. It has been found advantageous to predisperse the Aerosol OT into an approximately equal quantity of warm water heated to a temperature of about 40 to 60° C., and then incorporate the resulting dispersion into the other components in the mixing vessel with gentle stirring. Finally, the necessary amount of water (taking into consideration the water previously added in predispersing the Colloid 581B and the Aerosol OT) is then added to the mixing vessel with gentle stirring so as to make up the required amount of water. The pH of the composition should be maintained between about 8.0 to 8.5 during the application of the overcoating composition. Ammonium hydroxide can be used for pH adjustment, if necessary.

In the practice of the invention, the overcoating composition of the invention can be applied to or deposited on the activated surface of a polyolefin structure, e.g., a polyolefin film per se, a polyolefin film extruded or otherwise coated onto a substrate such as the various paper, foil, or cloth products, a sheet of polyolefin, or other polyolefin structure such as bottles, tubes, etc. employing any of the conventional coating techniques. Examples of coating techniques and equipment which can be employed in the practice of the invention include roll coaters such as rotogravure rolls, air knives, brush coaters, trailing knife blade coaters, size presses, immersion coating, roller and roll transfer, reverse roll coating, and others.

The amount of the coating composition applied to the activated surface of the polyolefin structure as an overcoat will depend upon the type of structure, its intended use, and other factors. Since said coating composition is applied in the "wet" liquid state, and since it is the solids which are deposited (upon drying of the liquid coating composition) which form the overcoat, it is more convenient to express the amount of said overcoat on a dry basis. Generally speaking, the amount of the coating composition applied to the polyolefin surface will usually be an amount, on a dry basis, within the range of from 0.05 to 1.8 pounds per 1000 square feet of surface. Stated another way, the amount of the liquid coating composition applied will be an amount sufficient to deposit, upon drying, from 0.05 to 1.8 pounds of solids per 1000 square feet of surface. When the polyolefin structure is a polyolefin film per se or a polyolefin film extruded onto a paper substrate, a frequently preferred range is 0.15 to 1.0 and sometimes more preferably 0.3 to 0.5, pounds per 1000 square feet, on a dry basis.

Prior to application of the coating composition to the surface of the polyolefin structure said surface is activated. A variety of methods are known in the prior art for accomplishing this. As used herein and in the claims, unless otherwise specified, the terms "active," "activated," and "activation," when employed in connection with or describing a polyolefin surface, are intended to refer to a surface which has been pretreated by a process such as flame oxidation; chemical oxidation; treatment with a variety of agents such as ozone, chlorine, and various acids; various forms of electrical bombardment or discharge treatments, etc. For example, a flame treatment such as that disclosed in U.S. Patents 2,632,921, 2,683,894, or 2,746,084 can be used. Or, a solution such as that disclosed in U.S. Patent 2,668,134 can be used. Or, preferably, one of the many forms of glow discharge, corona discharge, electrical bombardment, or otherwise termed electrical treatments such as those disclosed in U.S. Patents 2,910,723, 3,018,189, or 2,935,418 can be used. The apparatus and method for discharge treatment disclosed in said Patent 3,018,189 are a presently preferred way of pretreating or activating the polyolefin surface. An activation treatment such as those described above has been found necessary to obtain a tightly adherent overcoat.

The coating composition of the invention is particularly useful in overcoating polyolefin films per se and polyolefin films which have been extruded onto a substrate such as paper. Thus, in the latter instance as one embodiment of the invention, one method according to the invention comprises in combination the steps of: extruding the polyolefin onto the paper as a thin film; activating the surface of said film; substantially immediately thereafter coating said activated surface with the overcoating composition of the invention; and drying said overcoated film to deposit thereon an overcoat consisting essentially of the solids contained in said composition. Said individual steps per se can all be carried out employing apparatus and methods known in the prior art and thus individually form no part of the present invention. The methods of this invention reside in the combination of said steps when the coating composition of the invention is employed therein.

For example, the polyolefin can be extrusion coated onto the paper at extrusion temperatures within the range of from 500 to 700° F., preferably 550 to 650° F. using any standard extrusion process known to the art. The process is conveniently carried out "in line," i.e., continuously. The polyolefin coated paper is then passed over suitable rollers and through a treating zone, such as the electrical discharge treatment or flame treatments described above, for activation of the polyolefin surface to be overcoated. The coated paper now bearing an activated polyolefin surface is then carried over a series of one or more suitable rollers and the coating composition is applied to said activated surface by means including a rotogravure cylinder which determines the amount of coating composition (wet) applied. After application of the coating composition the paper is carried on suitable rollers and passed through a conventional hot air drying oven operated at a temperature within the range of from 140 to 500° F., preferably 300 to 400° F. From said oven the polyolefin coated and overcoated paper is then carried over a series of rollers to a rewind roller. Throughout the above continuous or "in line" operations the paper is run at speeds within the range of 50 to 3000, preferably 100 to 350 linear feet per minute.

The term "polyolefin" as used herein and in the claims, unless otherwise specified, refers to the normally solid polymers of 1-olefin hydrocarbons. As employed herein and in the claims, unless otherwise specified, the terms "polymer" or "polymers" include homopolymers of said 1-olefins, copolymers of one of said 1-olefins with another of said 1-olefins as a comonomer, and blends of at least one of said copolymers with normally solid polyisobutylene. The polymers of 1-olefins having from 2 to 4 carbon atoms per molecule are usually preferred. Examples of said homopolymers include polyethylene, polypropylene, poly-1-butene, and the like. An example of a copolymer within the above definition is a copolymer of ethylene with 1-butene having from 1 to 10, preferably 1.5 to 5, more preferably 1 to 3 weight percent of the 1-butene comonomer incorporated into the copolymer molecule. Examples of blends of said copolymers with polyisobutylene are those blends containing up to 35 weight percent, preferably from 1 to 35 weight percent of said polyisobutylene and from 99 to 65 weight percent of a copolymer of ethylene with one of said comonomers, e.g., 1-butene. Methods for preparing the above-described polymers are well known to those skilled in the art.

The following examples will serve to further illustrate the invention.

Example I

The wire side of a web of a Sub Bond 46 lb. paper, 58" wide, was extrusion coated in conventional manner with a commercially available polyethylene having a melt index of 1.7 and a density of 0.935 gram per cc. Said polyethylene contained 7.5 weight percent of carbon black and 5 weight percent of titanium dioxide dispersed therein. The extrusion temperature was approximately 600° F. and said polyethylene was applied at an average coating weight of 5 pounds per 1000 square feet of surface. The film was glossy finished. The polyethylene film coated paper thus formed was then fed over a series of rollers into a corona discharge zone operated in conventional manner to activate the surface of said film. The activated polyethylene surface of the thus prepared and treated paper-polyethylene web was then overcoated by applying to said surface, in conventional manner employing a rotogravure cylinder, an overcoating composition consisting essentially of

| Component: | Weight percent, wet basis |
|---|---|
| Rhoplex B15 | 37.32 |
| Colloid 581B | 0.80 |
| Surfynol 104E | 0.36 |
| Rhoplex B85 | 5.96 |
| Amberlac 165 | 38.72 |
| Paracol 404C | 1.48 |
| Aerosol OT | 0.44 |
| Water | 14.92 |
| | 100.00 |

The components of said composition were as defined above in Table I. Said rotogravure cylinder applied said composition at a rate of 1.33 pounds per 1000 square feet of surface (wet basis).

The thus overcoated web was then carried by suitable rollers through a hot air drying oven operated at 350° F. Upon drying, said composition deposited 0.4 pound per 1000 square feet of solids on said activated surface. The above operations were carried out continuously in line with a paper speed of 300 lineal feet per minute.

The thus deposited solids formed a continuous tightly adherent overcoat which was highly ink receptive as shown by the red ink-adhesive tape test. Said test is a standard test in the printing art and comprises applying a conventional red lithographic ink to the surface, allowing the ink to dry for five minutes, then applying the pressure sensitive tape (Scotch tape) over the dried ink. If the ink is firmly bonded, none is removed by the tape.

Subsequent commercial printing operations carried out in conventional manner using conventional inks showed the overcoat to be tightly adherent and to have an excellent ink receptivity and retention. The finished surface was characterized by high gloss and high scuff resistance. The excellent ink retention was also shown by the fact that the printing ink applied in the commercial printing operations was waterproof. These results are in marked contrast to the results obtained with commercially available coating such as the various protein-containing coatings which are not waterproof.

*Example II*

The felt side of a highly calendered 70-pound paper, 52 inches wide, was extrusion coated to a glossy finish in conventional manner with a commercially available polyethylene having a melt index of 5.0 and a density of 0.93 gram per cc. The extrusion temperature was approximately 600° F. and said polyethylene was applied at an average coating weight of 3.3 pounds per 1000 square feet of surface. The polyethylene surface of the polyethylene film coated paper thus formed was then activated and the activated surface then overcoated using the same overcoating composition and in essentially the same manner as in Example I above except that a paper speed of 250 lineal feet per minute was employed.

The wire side of said paper was then extrusion coated to a matte or dull finish in conventional manner using the same polyethylene as on the felt side. The extrusion temperature and coating weights were essentially the same as for the felt side. The polyethylene surface was then activated and overcoated as described for said felt side.

The overcoats on both sides of said paper were tightly adherent and were highly ink receptive as shown by the red ink-Scotch tape test. Subsequent commercial printing operations carried out in conventional manner using conventional inks also showed the overcoats to be tightly adherent, and to have an excellent ink receptivity and retention. The finished surfaces were characterized by excellent appearance and high scuff resistance. The commercially applied printing matter was waterproof.

*Example III*

In another run a paperboard having a polyethylene coating of an average 1 mil thickness was overcoated, after the polyethylene surface had been activated by corona discharge treatment, with a composition consisting essentially of

| | Weight percent, wet basis |
|---|---|
| Rhoplex B15 | 42.2 |
| Amberlac 165 | 37.3 |
| Paracol 404C | 6.8 |
| Water | 13.7 |
| | 100.0 |

The overcoated material had a very glossy finish and was scuff-resistant. However, the material had a poor ink receptivity as shown by failure to pass the red ink-Scotch tape test.

The above examples show that the combination overcoating composition yields, upon drying, a markedly superior overcoat for activated polyolefin surfaces. Said overcoat has excellent ink receptivity and retention properties, an excellent appearance, and high scuff resistance. The waterproof characteristics of printed matter placed on said overcoat is a particularly outstanding result. Said overcoat is also highly grease-resistant.

The above examples also show that the overcoating composition of the invention can be applied to both sides of a substrate.

It is also within the scope of the invention to include various colored pigments in the overcoating composition when a colored overcoat is desired. Aqueous solutions of aniline dyes can also be used to obtain color.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A composition, suitable for application as an overcoat for a polyolefin structure, said composition consisting essentially of:
   (a) from 35 to 40 weight percent of an aqueous dispersion of a copolymer of about 83 percent ethyl acrylate, 15 percent methyl methacrylate and 2 percent methacrylic acid, and containing about 46 percent solids;
   (b) a small but effective amount of a suitable internal anti-foaming agent;
   (c) a small but effective amount of a suitable external anti-foaming agent;
   (d) from 3 to 20 weight percent of an aqueous dispersion of polymethyl methacrylate containing about 38 percent solids;
   (e) from 30 to 50 weight percent of an ammoniacal aqueous solution containing about 23 weight percent of the ammonium salt of an essentially 1:1 copolymer of maleic anhydride and diisobutylene;
   (f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids;

(g) a small but effective amount of a suitable surfactant; and (h) from 15 to 25 weight percent water.

2. A composition, suitable for application as an overcoat for a polyolefin structure, said composition consisting essentially of:

(a) from 35 to 40 weight percent of an aqueous dispersion of a copolymer of about 83 percent ethyl acrylate, 15 percent methyl methacrylate and 2 percent methacrylic acid, and containing about 46 percent solids;

(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof;

(c) from 0.2 to 0.75 weight percent of an external anti-foaming agent consisting essentially of a 50 weight percent solution of 2,4,7,9-tetramethyl-5-decyne-4,7-diol in ethylene glycol;

(d) from 3 to 20 weight percent of an aqueous dispersion of polymethyl methacrylate containing about 38 percent solids;

(e) from 30 to 50 weight percent of an ammoniacal aqueous solution containing about 23 weight percent of the ammonium salt of an essentially 1:1 copolymer of maleic anhydride and diisobutylene;

(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids;

(g) from 0.25 to 1.0 weight percent of a surfactant consisting essentially of 75 percent dioctyl sodium sulfosuccinate, 5 percent ethyl alcohol, and 20 percent water; and (h) from 15 to 25 weight percent water.

3. A composition, suitable for application as an overcoat for a polyolefin structure, said composition consisting essentially of:

(a) from 35 to 40 weight percent of an aqueous dispersion of a copolymer of about 83 percent ethyl acrylate, 15 percent methyl methacrylate and 2 percent methacrylic acid, and containing about 46 percent solids;

(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof;

(c) from 0.2 to 0.75 weight percent of an external anti-foaming agent consisting essentially of a 50 weight percent solution of 2,4,7,9-tetramethyl-5-decyne-4,7-diol in ethylene glycol;

(d) from 3 to 10 weight percent of an aqueous dispersion of polymethyl methacrylate containing about 38 percent solids;

(e) from 35 to 45 weight percent of an ammoniacal aqueous solution containing about 23 weight percent of the ammonium salt of an essentially 1:1 copolymer of maleic anhydride and diisobutylene;

(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids;

(g) from 0.25 to 0.75 weight percent of a surfactant consisting essentially of 75 percent dioctyl sodium sulfosuccinate, 5 percent ethyl alcohol, and 20 percent water; and (h) from 15 to 25 weight percent water.

4. A polyolefin surface having thereon an adherent overcoat of the solids deposited upon drying a composition consisting essentially of (a) from 35 to 40 weight percent of an aqueous dispersion of a copolymer of about 83 percent ethyl acrylate, 15 percent methyl methacrylate and 2 percent methacrylic acid, and containing about 46 percent solids, (b) a small but effective amount of a suitable internal anti-foaming agent, (c) a small but effective amount of a suitable external anti-foaming agent, (d) from 3 to 20 weight percent of an aqueous dispersion of polymethyl methacrylate containing about 38 percent solids, (e) from 30 to 50 weight percent of an ammoniacal aqueous solution containing about 23 weight percent of the ammonium salt of an essentially 1:1 copolymer of maleic anhydride and diisobutylene, (f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids, (g) a small but effective amount of a suitable surfactant, and (h) from 15 to 25 weight percent water.

5. A polyolefin web, adapted to receive and retain thereon printing inks and adhesives, said web comprising: a film of polyolefin; and an adherent overcoat on said film, in an amount on a dry basis within the range of from 0.05 to 1.8 pounds per 1000 square feet of said surface, of a composition consisting essentially of (a) from 35 to 40 weight percent of an aqueous dispersion of a copolymer of about 83 percent ethyl acrylate, 15 percent methyl methacrylate and 2 percent methacrylic acid, and containing about 46 percent solids, (b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof, (c) from 0.2 to 0.75 weight percent of an external anti-foaming agent consisting essentially of a 50 weight percent solution of 2,4,7,9-tetramethyl-5-decyne-4,7-diol in ethylene glycol, (d) from 3 to 20 weight percent of an aqueous dispersion of polymethyl methacrylate containing about 38 percent solids, (e) from 30 to 50 weight percent of an ammoniacal aqueous solution containing about 23 weight percent of the ammonium salt of an essentially 1:1 copolymer of maleic anhydride and diisobutylene, (f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids, (g) from 0.25 to 1.0 weight percent of a surfactant consisting essentially of 75 percent dioctyl sodium sulfosuccinate, 5 percent ethyl alcohol, and 20 percent water, and (h) from 15 to 25 weight percent water.

6. A polyolefin web according to claim 5 wherein said polyolefin is a polymer of ethylene.

7. A packaging material, comprising: a paper product base; a coating of a polyolefin applied to at least one surface of said base; and an adherent overcoat on said polyolefin coating, said overcoat consisting essentially of solids deposited upon drying of a composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) a small but effective amount of a suitable internal anti-foaming agent,
(c) a small but effective amount of a suitable external anti-foaming agent,
(d) from 3 to 20 weight percent of an aqueous dispersion of polymethyl methacrylate containing about 38 percent solids,
(e) from 30 to 50 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) a small but effective amount of a suitable surfactant, and
(h) from 15 to 25 weight percent water.

8. A polyethylene structure, comprising: a polyethylene base; and an adherent overcoat applied to a surface of said structure in an amount on a dry basis within the range of from 0.05 to 1.8 pounds per 1000 square feet of surface, said overcoat consisting essentially of solids deposited upon drying of a composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof,
(c) from 0.2 to 0.75 weight percent of an external anti-foaming agent consisting essentially of a 50 weight percent solution of 2,4,7,9-tetramethyl-5-decyne-4,7-diol in ethylene glycol,
(d) from 3 to 20 weight percent of an aqueous dispersion of polymethyl methacrylate containing about 38 percent solids,
(e) from 30 to 50 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) from 0.25 to 1.0 weight percent of a surfactant consisting essentially of 75 percent dioctyl sodium sulfosuccinate, 5 percent ethyl alcohol, and 20 percent water, and
(h) from 15 to 25 weight percent water.

9. A composite web, comprising: a packaging material substrate; a polyolefin coating on said substrate; an adherent overcoat applied onto said polyolefin coating in an amount on a dry basis within the range of from 0.05 to 1.8 pounds per 1000 square feet of surface; and adhesive or printing ink on certain selected portions of said overcoat; said overcoat consisting essentially of solids deposited upon drying of a composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof,
(c) from 0.2 to 0.75 weight percent of an external anti-foaming agent consisting essentially of a 50 weight percent solution of 2,4,7,9-tetramethyl-5-decyne-4,7-diol in ethylene glycol,
(d) from 3 to 10 weight percent of an aqueous dispersion of polymethyl methacrylate containing about 38 percent solids,
(e) from 35 to 45 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) from 0.25 to 0.75 weight percent of a surfactant consisting essentially of 75 percent dioctyl sodium sulfosuccinate, 5 percent ethyl alcohol, and 20 percent water, and
(h) from 15 to 25 weight percent water.

10. A composite web according to claim 9 wherein said substrate is a paper product, and said polyolefin is polyethylene.

11. In combination: a polyethylene surface; and an adherent overcoat deposited onto said surface in an amount on a dry basis within the range of from 0.05 to 1.8 pounds per 1000 square feet of said surface; said overcoat being receptive to conventional printing inks applied by normal printing techniques, and said overcoat consisting essentially of solids deposited upon drying of a composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof,
(c) from 0.2 to 0.75 weight percent of an external anti-foaming agent consisting essentially of a 50 weight percent solution of 2,4,7,9-tetramethyl-5-decyne-4,7-diol in ethylene glycol,
(d) from 3 to 10 weight percent of an aqueous dispersion of polymethyl methacrylate containing about 38 percent solids,
(e) from 35 to 45 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) from 0.25 to 0.75 weight percent of a surfactant consisting essentially of 75 percent dioctyl sodium sulfosuccinate, 5 percent ethyl alcohol, and 20 percent water, and
(h) from 15 to 25 weight percent water.

12. A method for imparting printing ink receptivity and adhesive receptivity to a polyolefin surface, which method comprises: activating said surface; and applying an overcoat composition onto said activated surface in an amount on a dry basis within the range of from 0.05 to 1.8 pounds per 1000 square feet of said surface; drying said overcoat composition to form an overcoat on said surface; said overcoat composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) a small but effective amount of a suitable internal anti-foaming agent,
(c) a small but effective amount of a suitable external anti-foaming agent,
(d) from 3 to 20 weight percent of an aqueous dispersion of polymethyl methacrylate containing about 38 percent solids,
(e) from 30 to 50 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) a small but effective amount of a suitable surfactant, and
(h) from 15 to 25 weight percent water.

13. A method for imparting printing ink receptivity and adhesive receptivity to a polyethylene structure, which method comprises, in combination, the steps of: activating a surface of said structure; and substantially immediately thereafter applying to said activated surface, in an amount on a dry basis within the range of from 0.05 to 1.8 pounds per 1000 square feet of said activated surface, an overcoating composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof.
(c) from 0.2 to 0.75 weight percent of an external anti-foaming agent consisting essentially of a 50 weight percent solution of 2,4,7,9-tetramethyl-5-decyne-4,7-diol in ethylene glycol,
(d) from 3 to 20 weight percent of an aqueous dispersion of polymethyl methacrylate containing about 38 percent solids,
(e) from 30 to 50 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) from 0.25 to 1.0 weight percent of a surfactant consisting essentially of 75 percent dioctyl sodium sulfosuccinate, 5 percent ethyl alcohol, and 20 percent water, and
(h) from 15 to 25 weight percent water.

14. A method for preparing a composite web, which method comprises, in combination, the steps of: extruding onto a paper product a polyolefin film; activating the surface of said film; substantially immediately thereafter coating said activated surface with an overcoating composition applied in an amount on a dry basis within the range of from 0.05 to 1.8 pounds per 1000 square feet of activated surface; and drying said overcoat; said overcoating composition consisting essentially of
(a) from 35 to 40 weight percent of an aqueous dispersion of a copolymer of about 83 percent ethyl acrylate, 15 percent methyl methacrylate and 2 percent methacrylic acid, and containing about 46 percent solids,
(b) from 0.5 to 1.2 weight percent of an internal anti-foaming agent consisting essentially of a suspension of about 10 weight percent aluminum stearate in a solvent consisting essentially of about 3 parts of liquid polyoxyethylene and 1 part of a paraffin hydrocarbon selected from the group consisting of $C_{11}$ to $C_{13}$ paraffin hydrocarbons and mixtures thereof,
(c) from 0.2 to 0.75 weight percent of an external anti-foaming agent consisting essentially of a 50 weight percent solution of 2,4,7,9-tetramethyl-5-decyne-4,7-diol in ethylene glycol,
(d) from 3 to 10 weight percent of an aqueous dispersion of polymethyl methacrylate containing about 38 percent solids,
(e) from 35 to 45 weight percent of an ammoniacal aqueous solution containing about 23 weight percent of the ammonium salt of an essentially 1:1 copolymer of maleic anhydride and diisobutylene,
(f) from 1 to 3 weight percent of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids,
(g) from 0.25 to 0.75 weight percent of a surfactant consisting essentially of 75 percent dioctyl sodium sulfosuccinate, 5 percent ethyl alcohol, and 20 percent water, and
(h) from 15 to 25 weight percent water.

15. A method according to claim 14 wherein said polyolefin is polyethylene.

16. A method according to claim 14 wherein said polyolefin is polyethylene, and the surface of said polyethylene is activated by subjecting said surface to the action of a corona discharge.

17. A method according to claim 15 comprising in further combination the step of subjecting selected portions of said coated surface to printing.

18. A method according to claim 15 comprising in further combination the step of applying an adhesive to selected portions of said coated surface.

19. A method for preparing a composition, suitable for use as an overcoat composition for a polyolefin structure, which method comprises:
(a) introducing from 35 to 40 parts by weight of an aqueous dispersion of a copolymer of about 83 percent ethyl acrylate, 15 percent methyl methacrylate and 2 percent methacrylic acid, and containing about 46 percent solids into a mixing vessel;
(b) then dispersing from 0.5 to 1.2 parts by weight of an internal anti-foaming agent consisting essentially of a suspension of about 10 weight percent aluminum stearate in a solvent consisting essentially of about 3 parts of liquid polyoxyethylene and 1 part of $C_{11}$ to $C_{13}$ paraffin hydrocarbon in approximately an equal amount of water and introducing the resulting dispersion into said vessel with stirring;

(c) then introducing from 0.2 to 0.75 part by weight of an external anti-foaming agent consisting essentially of a 5 weight percent solution of 2,4,7,9-tetramethyl-5-decyne-4,7-diol in ethylene glycol into said mixing vessel with stirring;

(d) then introducing from 3 to 15 parts by weight of an aqueous dispersion of polymethyl methacrylate containing about 38 percent solids into said mixing vessel with stirring;

(e) then slowly introducing from 30 to 40 parts by weight of an ammoniacal aqueous solution containing about 23 weight percent of the ammonium salt of an essentially 1:1 copolymer of maleic anhydride and diisobutylene into said mixing vessel with stirring;

(f) then introducing from 1 to 3 parts by weight of an aqueous suspension consisting essentially of a microcrystalline wax having a melting point of 80 to 82° C. and a density of about 0.91 gram per cubic centimeter at 25° C., a small amount of a soluble polysaccharide, and containing about 48 weight percent solids into said mixing vessel with stirring;

(g) then dispersing from 0.25 to 0.75 part by weight of a surfactant consisting essentially of 75 percent sodium sulfosuccinate, 5 percent ethyl alcohol, and 20 percent water in approximately an equal quantity of warm water at a temperature of 40 to 60° C. and introducing the resulting dispersion into said mixing vessel with stirring;

(h) and then introducing from 15 to 25 parts by weight of water, including the water previously added in steps (b) and (g) above, into said mixing vessel with stirring.

References Cited by the Examiner

UNITED STATES PATENTS

| | | | |
|---|---|---|---|
| 2,757,106 | 7/1956 | Brown et al. | 117—155 |
| 2,795,564 | 6/1957 | Conn et al. | 260—29.6 |
| 2,817,640 | 12/1957 | Templin | 260—28.5 |
| 2,971,934 | 2/1961 | Brown et al. | 260—28.5 |
| 3,037,881 | 6/1962 | McDowell | 117—72 |
| 3,062,674 | 11/1962 | Houck et al. | 117—76 |
| 3,132,042 | 5/1964 | Weber | 117—76 |
| 3,140,194 | 7/1964 | Gagliardi | 117—15 |
| 3,152,081 | 10/1964 | Ovist et al. | 252—57 |
| 3,196,038 | 7/1965 | Schoh et al. | 117—68 |

FOREIGN PATENTS 662,584   5/1963   Canada.

MURRAY KATZ, *Primary Examiner.*

WILLIAM D. MARTIN, *Examiner.*

M. R. LUSIGNAN, *Assistant Examiner.*